July 6, 1948.　　　　J. C. POLLARD ET AL　　　　2,444,669
SUPPORT FOR SUBMERGED AREA SURVEYING
Filed March 10, 1945

JACK C. POLLARD
CLEMILLE F. SELLERS
INVENTORS

BY Lester B Clark
& Ray L. Smith
Attorneys

Patented July 6, 1948

2,444,669

UNITED STATES PATENT OFFICE 2,444,669

SUPPORT FOR SUBMERGED AREA SURVEYING

Jack Critz Pollard and Clemille Franklin Sellers, Houston, Tex., assignors to Robert H. Ray Co., a partnership Application March 10, 1945, Serial No. 582,102

4 Claims. (Cl. 248—165)

This invention relates to geophysical prospecting and more particularly to a support for prospecting instruments, particularly when surveying is being carried out in water covered areas.

In geophysical prospecting in water covered areas, it has been proposed to provide instruments that can be lowered to, and to rest with stability, upon the submerged surface. It has also been proposed to provide structures of a semi-permanent nature in the water, such structures being of sufficient stability against external influences such as wind and waves, that delicate instruments such as the gravimeter, magnetometer, seismograph instruments, etc., can be supported thereon.

The present invention is concerned with providing an instrument support which can be readily constructed and dismantled, and which possesses adequate stability that accurate readings of sensitive and delicate instruments mounted thereon may be had. It is, therefore, the primary object of the invention to provide a support of the type described.

Another object is to provide a support which is inexpensive and which may be repeatedly used.

A further object is to provide a support from pipes, bars, or similar elongated members which are readily available.

A still further object is to provide a plurality of support members engaging the submerged surface at spaced points, such members being interconnected at, or above, the surface of the submerging medium whereby the support assembly encompasses a solid angle above the area circumscribed by said spaced points.

It is also an object to provide interposed vibration absorbing material between component parts of the support.

It is also an object to provide an instrument platform on a support constructed in the manner above indicated.

A still further object is to suspend the instrument platform from the support assembly.

A further object is to provide means for adjustably positioning the platform at a desired elevation relative to the support.

The foregoing objects, together with further objects will be apparent from the following description considered in connection with the accompanying drawing which:

Figure 1:
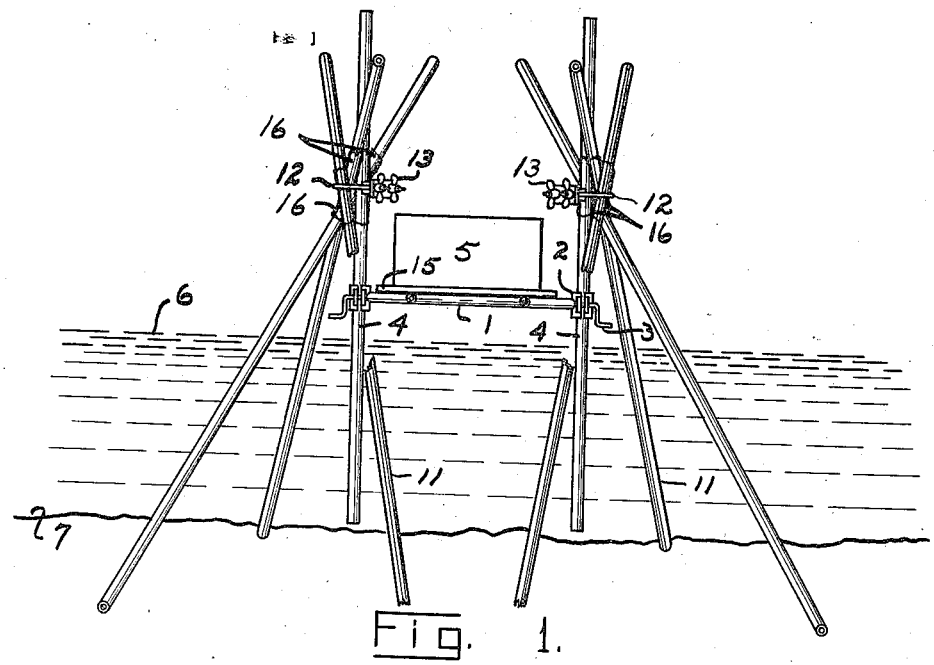
Fig. 1 is an elevational view of one embodiment of the invention, the view being taken on line 1—1 in Fig. 2.
Figure 2:
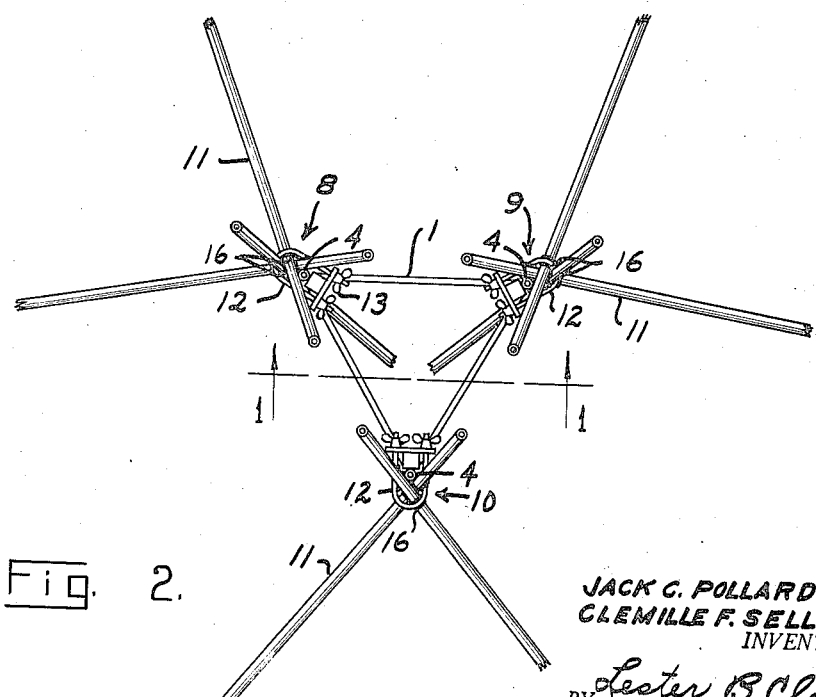
Fig. 2 is a plan view of the embodiment of the invention as shown in the drawings.

The device embodying the invention comprises a triangular frame 1 which is provided with split collars 2 at points about its periphery. Each of these collars is provided with a suitable locking mechanism such as threaded crank members 3, so that the frame can be clamped in any desired position upon supports 4 extending vertically through these clamps. It is to be understood that the frame 1 is intended to serve as a support for a geophysical prospecting instrument 5, so that readings can be obtained during the surveying of an area covered by a body of water 6, above the submerged surface 7.

The support further described herein comprehends the use of elements to minimize the transfer of vibrations from piece to piece and thence to the instrument 5. To further reduce such transfer of vibrations the instrument 5 is made to rest upon a pad or pieces of vibration absorbing material 15 such as a low density wood, fibrous material and/or sponge rubber, etc.

Each of the support members 4 comprises an element of the respective support assemblies 8, 9, and 10. Each of such assemblies also includes a plurality of uprights shown as pipes 11, although it is to be understood that any other suitable elongated upright members may be utilized. It is also to be noted that each of assemblies 8 and 9 comprises three of the uprights 11. The bases of these uprights in each of these assemblies are supported at spaced points upon the submerged surface 7 so that each assembly circumscribes an area upon such surface, and each support assembly encompasses a solid angle above the circumscribed area. While three uprights only are shown, it is to be understood that additional uprights in any given assembly may be used. It is also desirable that at least 2 of the support assemblies shall comprise at least three uprights.

The uprights 11 of each assembly converge toward a common point proximate one of the supports 4. A vibration absorbing substance such as fibrous material, strips of balsa wood, etc. is placed at the points where the members 11 would otherwise engage each other as indicated at 16. The component elements of the support are then interconnected into a unitary structure by means of clamps 12 provided with wing nuts 13 to facilitate manual clamping action of the component parts of the respective support assemblies.

In the use of the device of the invention the component parts thereof are usually carried to location by boat. The uprights 11 are positioned one by one by locating the bases thereof upon the submerged surface 7. If this surface is soft the uprights are pushed into the surface a sufficient distance to insure stability of the assemblies. However, the cleavage of the submerged surface by the uprights is not necessary where a firm surface exists. It has been found that desired stability is had upon such a surface, and also that operations are expedited thereby.

The uprights 11 of the respective assemblies are brought together with one of the vertical supports 4 and interposed vibration absorbing material 16, and the clamp 12 is applied to each assembly whereby a unitary structure of the assembly is effected. The collars 2 about the supports 4 are then released and the frame 1 is moved to the desired elevation whereupon the instrument 5 is positioned upon the frame 1 preliminary to the making of observations. In a case where the instrument 5 is of the non-recording type, observations may be made from a boat adjacent the support but out of contact therewith. Alternately a second support of the class described may be assembled adjacent the instrument bearing support, the operator making necessary observations from such second support.

Although a maximum of three uprights 11 are shown in any of the support assemblies 8, 9, and 10 of the disclosed embodiment, it is to be understood that any additional number of uprights as may be deemed necessary will be used. An important feature, as already indicated, is that the uprights define a solid triangle, or other solid pyramidal enclosure, of which the configuration is dependent upon the number of uprights used.

It is to be noted that the described structure embodying the invention is such as to provide stability, is of light weight and does not have a concentration of weight above the water level. This avoids any effect from action as an inverted pendulum and hence the stability is enhanced.

Broadly the invention comprehends an instrument support which is of special utility in geophysical prospecting of submerged areas.

The invention claimed is:

1. A support for a geophysical instrument for water covered areas comprising, a frame, spaced clamping means about said frame, a vertical support in each of said means, whereby the frame is vertically adjustable on the supports, a support assembly for each of said supports, each of said assemblies comprising a plurality of uprights having their bases engaging the submerged surface at spaced points and extending convergingly upwardly toward a point proximate one of said supports, and additional clamping means interconnecting the uprights and support at each assembly whereby the frame is suspended upon the assemblies.

2. A support for water covered areas comprising, a frame, vertical supports therefor, a support assembly for each of said supports, each of said assemblies comprising a plurality of uprights having their bases engaging the submerged surface at spaced points and extending convergingly upwardly toward a point proximate one of said supports, and separate releasable means clamping each support and juxtaposed uprights into a rigid support assembly, the upright of at least two of said assemblies subtending a solid angle above the area circumscribed by the points of engagement of the uprights with the submerged surface.

3. A support including, a plurality of support assemblies, each of said assemblies comprising clamp means, a plurality of uprights interconnected by each of said clamp means and having their lower ends located at spaced points, a frame, an additional upright in each of said assemblies secured by and depending from said clamp means, and means for adjustably positioning said frame at different levels upon said additional uprights and below said clamp means.

4. A support for water covered areas comprising a frame, vertical supports therefor, a support assembly for each of said supports, each of said assemblies comprising a plurality of uprights having their bases engaging the submerged surface at spaced points and extending convergingly upwardly toward a point proximate one of said supports, vibration absorbing means interposed between at least some of the component parts of each of said assemblies, and separate releasable means clamping each support and juxtaposed uprights into a rigid support assembly.

JACK CRITZ POLLARD.
CLEMILLE FRANKLIN SELLERS.

REFERENCES CITED

The following references are of record in the file of this patent:

UNITED STATES PATENTS

| Number | Name | Date |
| --- | --- | --- |
| 351,914 | Hayes | Nov. 2, 1886 |
| 366,833 | Hipwell | July 19, 1887 |
| 964,140 | Zahniser | July 12, 1910 |
| 2,069,590 | Neumann et al. | Feb. 2, 1937 |